June 1, 1926.
W. V. SEIFERT
BEET HARVESTER
Filed June 8, 1925 2 Sheets-Sheet 1
1,587,243
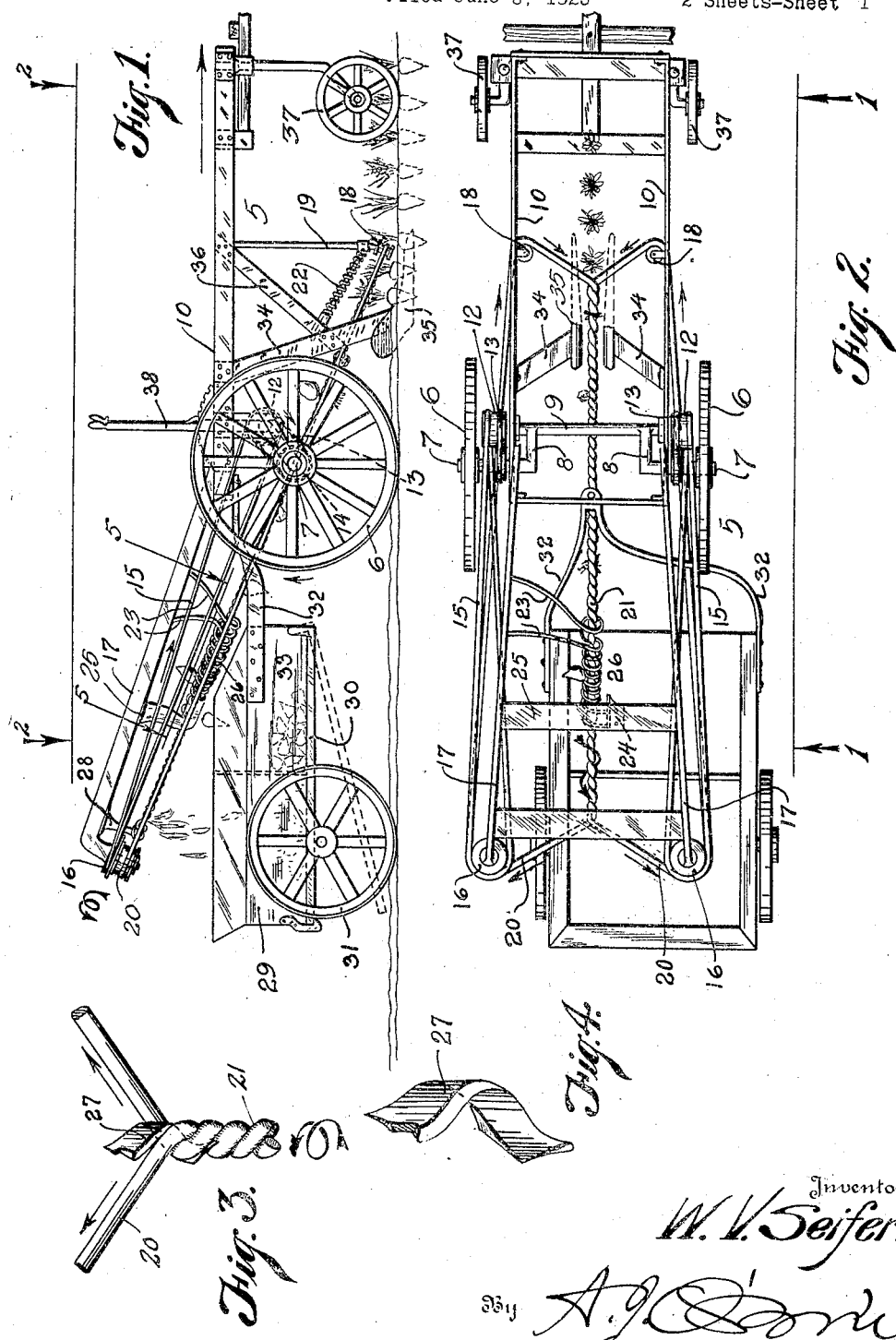
Inventor
W. V. Seifert.

June 1, 1926.
W. V. SEIFERT
BEET HARVESTER
Filed June 8, 1925
1,587,243
2 Sheets-Sheet 2
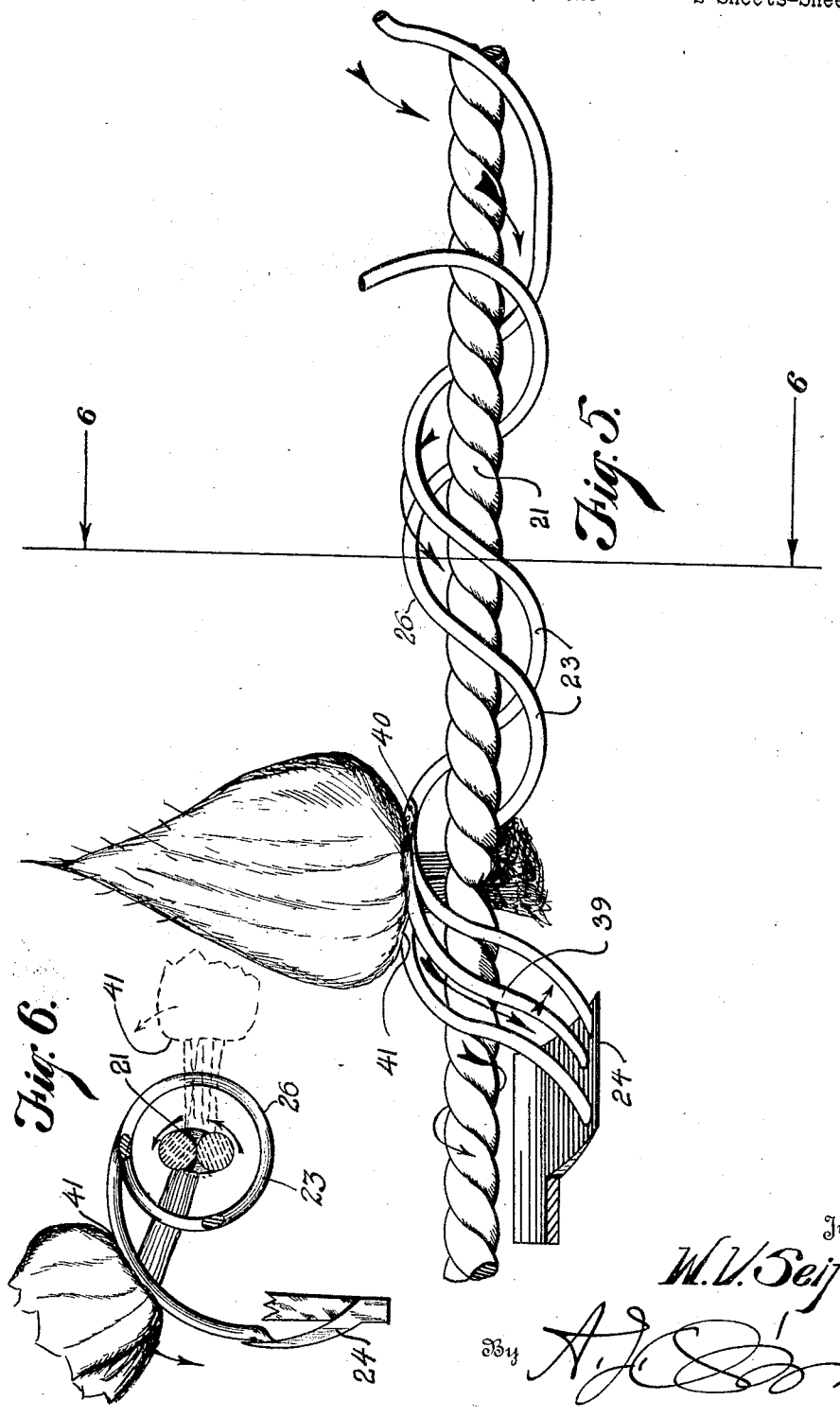

Patented June 1, 1926.

1,587,243

UNITED STATES PATENT OFFICE.

WILLIAM V. SEIFERT, OF DENVER, COLORADO.

BEET HARVESTER.

Application filed June 8, 1925. Serial No. 35,562.

My invention relates to improvements in beet harvesters, my object being to provide a construction of this class whereby the beets are caught by the tops, carried upwardly to a knife where the tops are removed, the beets being discharged into a suitable receptacle while the tops or foliage are carried on and discharged into a separate receptacle. Connected with the structure is a pulling device of the ordinary type whereby the beets are loosened or lifted sufficiently to be acted on by the conveyor, the latter being composed of two endless belts, ropes or cables which are suitably mounted upon pulleys or drums, their inner runs being united in twisting relation, this twisted portion of the belts serving as a conveyor for the beets, the belts being so inclined that the forward extremity of their twisted portion or their conveyor member is lowermost and in position to receive the tops of the beets, whereby, when the belts are in motion, the beets are carried around and around as they are carried upwardly. The upper portion of the twisted member of the belts is surrounded by a spiral guide which acts upon the bodies of the beets and directs them to the topping knife which is arranged adjacent and at the upper extremity of the said guide. A short distance in the rear of this guide is located a blade which is shaped to be engaged by the twisted portion of the belts, this blade being so constructed that it cuts the foliage free from the twisted conveyor member of the belts thus preventing any resistance to the separation of the two runs of the belts at the upper extremity of their twisted portion.

Having briefly outlined my improvement I will proceed to describe the same in detail, reference being made to the accompanying drawing in which is illustrated an embodiment thereof.

In this drawing:

Fig. 1 is a side elevation of my improved beet harvester.

Fig. 2 is a top plan view of the same.

Fig. 3 is a fragmentary detail view of the two belts constituting the conveyor, a short length of the twisted portion being shown. This view is on an enlarged scale as compared with Figs. 1 and 2.

Fig. 4 is a fragmentary detail view of the blade for cutting the foliage carried by the twisted member of the belts. This view is on a still larger scale.

Fig. 5 is a fragmentary detail view illustrating a portion of the twisted conveyor member of the belts shown in connection with the spiral guide for the beets which cooperates with the topping knife, the latter also being shown.

Fig. 6 is a section taken on the line 6—6, Fig. 5, looking toward the left.

The same reference characters indicate the same parts in all the views.

Let the numeral 5 designate the framework of a beet harvester which is centrally supported by ground wheels 6 journaled on stub axles 7 which are connected with crank arms 8 made fast to the main axle or rock shaft 9 the latter being journaled in the chassis 10 of the machine, the outer extremities of the main axle 9 carrying drums 12 which are journaled thereon and which are connected by means of chains or other suitable flexible devices 13 with sprocket wheels 14 carried by the ground wheels 6, whereby motion is transmitted from these wheels to the drums 12. The drums 12 are connected by driving belts or other suitable flexible devices 15, with other drums 16 supported by bars 17 which are inclined upwardly from the central portion of the chassis of the machine. By virtue of this construction the two sets of drums 12 and 16 are operated.

Mounted upon the drums 16 and their cooperating drums 18 which are connected with the lower extremities of vertically disposed bars 19, are two endless belts, ropes or cables 20 whose inner runs are twisted together to form a conveyor member 21, the lower extremity of this member being located near enough to the ground when the machine is in operation for beet harvesting purposes, to catch the foliage of the beets and carry the latter upwardly as heretofore outlined. Connected with the lower portion of each of the supporting bars 19, is a tension device 22, the function of which is to maintain the two endless belts 20 at the proper tension in order to properly perform their function.

Supported upon a stationary portion of the framework, as one of the bars 17, are two rods 23 which are coiled around the twisted portion 21 of the belts to form a guide 26 for the beets just before they reach the topping knife 24, the rear extremities of the rods 23 being connected with the said knife which is also suitably supported upon the framework of the structure. As shown in the drawing, the knife 24 is directly supported upon a cross piece 25 connecting the two frame bars 17.

Slightly in the rear of the rear extremity of the spiral guide 26 is a blade 27 which is also supported upon a stationary part of the framework as by bracket 28, the said blade being shaped to conform to the twisted runs of the two endless belts, the forward extremity of this blade having a sharpened portion adapted to cut the foliage loose from the conveyor member 21 of the endless belts, so that, as the belts separate at the extremity of the member 21 the loosened foliage will drop into a compartment 29 of a receptacle 30 which is mounted on ground wheels 31 and suitably connected with the chassis of a machine as by a draw bar structure 32. The forward portion of the receptacle 30 constitutes a compartment 33 for the bodies of the beets and into which they drop as the tops are severed by the knife 24.

Extending downwardly from the chassis 10 of the framework of the machine are bars 34 with whose lower extremities are connected pulling devices 35 which enter the ground on opposite sides of the row of beets and are so positioned as to raise the beets out of the ground just in time to allow the lower extremity of the conveyor member 21 of the endless belts, to catch the tops or foliage of the beets. The supporting bars 34 are further strengthened by braces 36 whose upper extremities are also connected with the chassis of the machine. The forward extremity of the chassis is supported upon relatively small wheels 37.

From the foregoing description it will be understood that the vital feature of my improvement consists of the two endless belts having their inner runs connected in twisted relation to form a conveyor for the beets whereby the latter are caused to travel in swinging relation around this conveyor member until the bodies of the beets are removed from the tops, after which the tops continue upwardly with the conveyor member being later loosened by the blade 27 and finally dropped as the two inner runs of the belts separate at the upper extremity of the twisted conveyor member.

The machine is provided with a lever 38 which is connected with the main axle or rock shaft 9 whereby the latter may be actuated for the purpose of raising and lowering the machine in a manner that will be readily understood.

From the drawing it will be seen that when my improved beet harvester is in use it is positioned so that the conveyor member 21 of the two endless belts is in line with the row of beets to be harvested, and as the machine moves along, the plows loosen and lift the beets after which their foliage is grasped by the lower extremity of the twisted conveyor member 21, and as the two endless belts are kept in motion, the beets are carried upwardly by their foliage and finally carried by the spiral guide 26 to the topping knife 24 where the bodies are removed from the foliage after which the latter is loosened by the blade 27 and finally drops from the conveyor member of the endless belts as heretofore described. Further, as the machine travels over the ground, motion is transmitted from the ground wheels 6 to the drums 12 and thence to the drums 16, the latter in turn imparting the travel to the endless belts 20 which are further supported by the drums 18 which are simply idlers and move only as movement is imparted to them by the said belts.

In further explanation of the structure I wish to explain that the spiral guide 23 is provided at its extremity adjacent the topping knife 24 with a spring arm 39 located between the two rods of the guide, one extremity being fastened to one of the rods as shown at 40, while its other extremity extends practically to the knife 24. In the case of small beets having comparatively little foliage, this spring arm may be necessary in order to cause the guide to direct the beet into topping relation with the knife, while with larger beets having considerable foliage, the spring arm will yield as it may be necessary to allow the larger quantity of foliage to pass.

It should also be explained that the rear extremity of the spiral guide, where it engages the knife, extends somewhat farther from the twisted conveyor member 21 than the other portions of the guide, whereby the guide is caused to engage the shoulder 41 of the beet before the latter reaches the knife. It may be that the shoulder of the beet is some distance from the spiral guide before the terminal portions adjacent the knife 24 are reached as shown by dotted lines in Fig. 6. However, by virtue of the fact that the portion of said guide adjacent the knife 24 extends farther from the conveyor 21 than the position on said guide, indicated by the dotted lines in Fig. 6, this terminal portion will be caused to engage the shoulder of the beet as shown by full lines in Fig. 6 before the latter reaches the topping knife, thus insuring that the top or foliage of the beet is severed close to the shoulder of the latter or at the proper topping point. Should it happen that the terminal of the spiral guide engages the shoulder of the beet before the latter has reached the knife or the point of the terminal farthest from the conveyor 21, in that event the action of said terminal on the shoulder while the conveyor 21 holds the foliage, may cause the flexible conveyor member to bend sufficiently to compensate for the conditions stated.

I claim:

1. A beet harvester comprising a framework and two endless belts or cables mounted thereon in cooperative relation and having portions twisted together.

2. A beet harvester comprising a framework and two endless flexible devices mounted thereon in cooperative relation and having portions twisted together to form a conveyor, and means for simultaneously imparting travel to the devices.

3. A machine of the class described comprising a framework, endless flexible devices mounted thereon in cooperative relation and having portions of their runs twisted together, and means for simultaneously imparting travel to the said devices at equal speed whereby their twisted portions form a conveyor for the beets.

4. A beet harvester comprising a framework, ground wheels supporting the framework, two endless flexible members supported to travel on the framework in proximity and having twisted portions and means for imparting travel to the said members from the ground wheels of the machine.

5. A machine of the class described, comprising a framework mounted to travel, endless flexible devices mounted in proximity to travel thereon and having portions of their lengths connected in twisted relation to form a conveyor, and a spiral guide surrounding a portion of the twisted run of the conveyor.

6. A machine of the class described comprising a framework, endless flexible devices mounted in proximity to travel thereon and having portions of their lengths connected in twisted relation to form a conveyor member, and a knife mounted adjacent said member for topping the beets.

7. A machine of the class described comprising a framework, endless flexible devices mounted thereon in proximity and having portions of their lengths connected in twisted relation to form a conveyor, a spiral guide surrounding a portion of the twisted conveyor and a knife cooperating with the spiral guide for topping the beets.

8. A machine of the class described comprising a framework, endless flexible devices mounted to travel thereon and having portions of their lengths connected in twisted relation to form a conveyor member, and a spiral blade engaged by the twisted portions of said devices.

9. A machine of the class described comprising a framework, endless flexible devices mounted to travel thereon and having portions of their lengths connected in twisted relation to form a conveyor member, a spiral guide surrounding a portion of said conveyor member, a knife cooperating with the spiral guide for topping the beets, and a spiral blade mounted to be engaged by the conveyor member, said blade being located in the rear of the topping knife to loosen the foliage and prevent resistance to the separation of the flexible devices at the rear extremity of the conveyor member.

10. A beet harvester comprising a frame, and endless flexible devices mounted thereon and having portions of their runs connected in twisted relation to form a conveyor member, this member being inclined so that its lower extremity is in position to catch the foliage of the beets, the foliage being discharged at the upper extremity of said member.

11. A beet harvester comprising a frame, endless flexible devices mounted thereon and having portions of their runs connected in twisted relation to form a conveyor member, this member being inclined so that its lower extremity is in position to catch the foliage of the beets, the foliage being discharged at the upper extremity of said member, and a knife mounted adjacent said conveyor member for topping the beets.

12. A beet harvester comprising a frame, endless flexible devices mounted thereon and having portions of their runs connected in twisted relation to form a conveyor, this member being inclined so that its lower extremity is adapted to catch the foliage of the beets while this foliage is discharged at its upper extremity, an intermediately located spiral member surrounding the said conveyor member for guiding the beets and a knife mounted adjacent said spiral member and at the rear extremity thereof for topping the beets.

13. A machine of the class described comprising a frame, endless flexible devices mounted thereon and having portions of their runs connected in twisted relation to form a conveyor member, this member being inclined so that its lower extremity is adapted to catch the foliage of the beets, the said foliage being adapted to be discharged at the upper extremity of said twisted member and a blade shaped to conform to the twist of the said twisted member and engaged by the latter for cutting loose the foliage.

14. A beet harvester comprising a frame, two endless belts mounted thereon and having portions of their runs connected in twisted relation to form a conveyor member, the said member being inclined so that the foliage on the belts is caught at its lower extremity and discharged at its upper extremity, an intermediately located spiral device surrounding the conveyor member for guiding the bodies of the beets, a topping knife at the rear end of said spiral device and a blade engaged by the runs of the conveyor member for cutting loose the foliage, said blade being located in the rear of the topping knife.

15. A beet harvester comprising a frame, ground wheels supporting the frame, two endless belts having portions of their runs connected in twisted relation, upper and lower pulleys mounted on the frame and engaged by the said belts, and an operative connection between the ground wheels and one set of said pulleys for driving the belts.

16. A beet harvester comprising a frame, ground wheels supporting the frame, two endless belts having portions of their runs connected in twisted relation, upper and lower drums mounted on the frame and engaged by the said belts, the lower drums having depending supports. tension devices acting on said supports, and an operative connection between the ground wheels and the upper set of drums for driving the belts.

17. A machine of the class described comprising a framework, endless flexible devices mounted thereon in proximity and having portions of their lengths connected in twisted relation to form a conveyor, a spiral guide surrounding a portion of the twisted conveyor and a knife cooperating with the spiral guide for topping the beets, the rear portion of the spiral guide extending farther from the twisted conveyor than the body of said guide for the purpose set forth.

18. A machine of the class described comprising a framework, endless flexible devices mounted thereon in proximity and having portions of their lengths connected in twisted relation to form a conveyor, a spiral guide surrounding a portion of the twisted conveyor, a knife cooperating with the spiral guide for topping the beets, and a spring arm secured at one extremity to one member of the spiral guide and normally occupying a position between the terminal members of said guide adjacent the knife, its extremity opposite the fastened end being free to move in response to the pressure of the foliage of the beet.

In testimony whereof I affix my signature.

WILLIAM V. SEIFERT.